United States Patent Office 3,342,902
Patented Sept. 19, 1967

3,342,902
HOT MELT ADHESIVE HAVING PRESSURE SENSITIVITY COMPRISING ATACTIC POLYPROPYLENE, ETHYLENE-VINYL ACETATE COPOLYMER, AND A POLYTERPENE
Melvin E. Peterkin, Brookhaven, Pa., assignor to Sun Oil Company, Philadelphia, Pa., a corporation of New Jersey
No Drawing. Filed July 21, 1965, Ser. No. 473,805
4 Claims. (Cl. 260—897)

ABSTRACT OF THE DISCLOSURE

A hot melt adhesive composition which is suitable for bonding two materials together such as a corrugated paper medium to a facer sheet in order to produce corrugated paper board is produced by blending together into a homogenous mixture 74–82 weight percent atactic polypropylene, 2–9 weight percent ethylene-vinyl acetate copolymer and 9–18 weight percent of polyterpene resin. The atactic polypropylene has a molecular weight in the range of 16,000 to 60,000. The ethylene-vinyl acetate copolymer has 18–34 weight percent vinyl acetate and the terpene resin has a molecular weight of about 1200.

---

This invention relates to hot melt adhesive compositions. In particular, it relates to hot melt adhesive compositions produced from low-cost materials and suitable for bonding a variety of materials together.

Hot melt adhesives produce a bond by mere cooling as distinguished from cross-linking or other chemical reactions. Prior to heating, the hot melt adhesives are solids that can be prepared in bulk or pellet form for ease of handling. Upon heating, the hot melt adhesive composition melts rather sharply and flows freely for application to a substrate. Since the hot melt adhesives of the present invention are thermoplastic rather than thermosetting, and thus remeltable, they can be applied to a substrate at one time and later remelted to form a hot melt bond with another substrate.

Hot melts are useful adhesives for bonding wood, paper, plastics, textiles and other materials. One use for which they are well suited is the fabrication of corrugated paper board. Hot melts used for producing corrugated paper board must have high bond strength under conditions of shock stress, high humidity and extremes of temperature encountered in transportation and storage. In addition, the melt point, wetting time, initial tack, setting time, pot life and general handling qualities on automatic corrugated board machinery are essential considerations.

I have found that the object of providing a high performance, hot melt adhesive can be obtained by blending in a homogenous mixture atactic polypropylene, a copolymer of ethylene and vinyl acetate and a terpene resin. The compositions of the present invention have excellent properties for use in bonding materials. For instance, the hot melt compositions can be used to bond a corrugated kraft paper to top and bottom facer sheets to produce a corrugated paper board of good quality.

The atactic (essentially non-crystalline) polypropylene is formed during the stereospecific polymerization of propylene. The polymerization takes place in the presence of a catalyst comprising a coordination complex of a transition metal halide with an organometallic compound. The atactic polypropylene usually represents from about 5 to 15 weight percent of the polymerization product, the remainder being isotactic (essentially crystalline) polypropylene. The solid atactic polypropylene suitable of the composition of the invention has a molecular weight of 15,000 to 60,000 and more particularly from 16,000 to 20,000. It is soluble in boiling pentane, hexane, heptane and other hydrocarbons.

In one known process, the polymerization product in the reaction medium is contacted with a solvent consisting of methanol and water to kill the catalyst. The catalyst is then removed in solution leaving a heptane slurry. The atactic polypropylene is in solution in the heptane, and this solution is removed from the isotactic polymer. The solution is distilled to recover the heptane solvent which is recycled. The solid material which remains is the atactic polypropylene employed in the compositions of this invention. Suitable atactic polypropylene is available commercially, such as "Oletac 100" produced by Avisun Corporation.

TABLE I.—PROPERTIES OF ATACTIC POLYPROPYLENE EMPLOYED

| | |
|---|---|
| Molecular wt. | 16,000 to 20,000 |
| Viscosity, cp. at 300° F. | 42,00 to 5,800 |
| Ring and ball, °C. | 115 to 121 |
| Intrinic viscosity[$\eta$] | .28 |

The terpene resins suitable for the compositions of the instant invention include both the alpha- and the beta-pinene resins. The terpene resins are commercially available, such as "Piccolyte S–115" and "Piccolyte XA–115." Either alpha- or beta-pinene resins having a molecular weight of about 1200 and ring and ball melt point of about 115° C. are employed.

In one known procedure for producing the terpene resins, the pinene is diluted with a refined hydrocarbon solvent, such as naphtha cut and contacted with a Friedel-Crafts catalyst. After the initial heat evolution reactions have subsided, an additional contacting period with the catalyst is provided. The catalyst is removed by successive washings with water and dilute aqueous alkali and separation of the aqueous and hydrocarbon phases. The hydrocarbon phase is then subjected to high temperature and steam distillation. The pinene resin for the present invention remains in the stillpot.

Properties of "Piccolyte" are as follows

TABLE II

| | Piccolyte S–115 $\beta$=Pinene resin | Piccolyte AX–115 $\alpha$=Pinene resin |
|---|---|---|
| Ring and Ball Melt Point, ° C | 115 | 115 |
| Bromine No | 3–5 | 15–20 |
| Density @ 15.5° C | 0.980 | 0.980 |
| Color Gardner Scale | 1–3 | 5–6 |
| Molecular Weight | ¹ 1,200 | ¹ 1,200 |

¹ About.

The preparation of ethylene-vinyl acetate copolymer is known in the art. Preparations are shown in United States Patent No. 2,200,429 to Perrin et al. and Canadian Patent No. 657,977 to Strauss dated Jan. 29, 1963. Generally, the preparation involves copolymerizing a mixture of ethylene and vinyl acetate by means of a free-radical producing catalyst, such as oxygen, or an organic peroxide, at a pressure of 100 to 200 atmospheres and a temperature in the range of 150° C. to 250° C. and recovering the product. The proportion of vinyl acetate in the resin does not appear to be important in the instant compositions. Resins containing 18 to 35 wt. percent vinyl acetate are compatible in amounts of up to 25 wt. percent with atactic polypropylene at 250° F. to 300° F. Preferably, resins containing from about 30 to 34 wt. percent of vinyl acetate are employed in the present compositions. These resins have a ring and ball point of about 220° F. to 270° F. and intrinsic viscosity of about .60 to .80.

The relative amounts of ingredients found to produce hot melt compositions suitable for the purpose of the present invention are 74 to 82 wt. percent atactic polypropylene, 2 to 9 wt. percent ethylene-vinyl acetate copolymer resin and 9 to 18 wt. percent of a terpene resin. The preferred range of ingredients is 75.5 to 79.5 wt. percent atactic polypropylene, 3 to 8 wt. percent ethylene-vinyl acetate copolymer resin and 16.5 to 17.5 wt. percent of a terpene resin.

The hot melt adhesive is prepared by mixing the ingredients at a temperature in the range of 200° to 400° F. Preferably the lowest temperature that will result in sufficient softening of all the ingredients is used. This prevents unnecessary oxidation of the compositions and is most economical. In the instant case, temperatures in the range of 225 to 275° F. are preferred. Usually the mixing is carried on at about 250° F.

Mixing may be carried out in any suitable manner. Satisfactory mixing is easily carried out in a heated Sigma Blade mixer. The ingredients should be allowed to stand in the mixer until they are somewhat softened. The mixing is continued until the adhesive composition is homogeneous.

For application to a surface, the adhesive is heated to a temperature in the range of 250 to 300° F. Generally, the lowest temperature that produces the viscosity desired and suitable for the particular application of the hot melt adhesive is employed.

The hot melt adhesives were screened by two simple tests.

The first test is the tear seal test. The sample is made on 50 pound kraft paper cut into 1 by 6 inch strips. One strip is coated on a single side for a length of two inches with a 1 to 2 mil coating of hot melt adhesive and another strip is placed over the first strip. The sample then consists of two layers of paper bonded together on internal surfaces over a two square inch area at one end. The test is made by gripping the free ends of the strips and pulling slowly in opposite directions perpendicular to the bond. A tear seal is indicated when the adhesive bond produces failure in the substrate (in this case kraft paper) at room temperature and at −25° F. The latter temperature is used to test for brittleness at the most severe low temperature service conditions the bond might be expected to encounter.

The second test is the creep test. This test is made by forming a 2 inch lap joint with two 1 by 6 inch 50 pound kraft paper strips. The sample is joined by a two square inch area of adhesive having thickness of 1 to 2 mils. The total length of the sample is 10 inches. The strip is suspended for one-half hour in an oven at the desired temperature with a 100 gram weight attached to the bottom of the lower strip. In the instant test the temperaure was raised in 5° C. increments from 100 to 120° C. and maintained at each temperature for one-half hour. This test is designed to determine the susceptibility of the adhesive bond to deformation as a function of temperature. Stability of the bond at 75° C. or greater is considered adequate.

*Examples 1–5*

In the five examples set out below, Elvax 150 was employed as the ethylene-vinyl acetate copolymer resin. Elvax 150 can be characterized as having a vinyl acetate content of about 33 weight percent, a ring and ball melt point of 243° F. and an intrinsic viscosity of 30° C. of 0.78.

TABLE III

| Ex. | Atactic Polypropylene | Ethylene vinyl acetate copolymer | Terpene resin α pinene | Viscosity, cps. at ° F. | | | Ring and Ball, ° C. | Creep, ° C. | Seal | |
|---|---|---|---|---|---|---|---|---|---|---|
| | | | | 300 | 325 | 350 | | | R | −25° F. |
| 1 | *90 | 10 | 0 | 8,000 | 5,400 | 3,600 | 118 | -------- | Q | N |
| 2 | *90 | 10 | 20 | 5,300 | 3,500 | 2,300 | 112 | >120 | Q | 50%T |
| 3 | *90 | 5 | 20 | 4,700 | 3,100 | 2,100 | 112 | >120 | Q | 50T |
| 4 | *90 | 2.5 | 20 | 4,100 | 2,800 | 1,900 | 113 | 115 | T | 50%T |
| 5 | *90 | 10 | 10 | 6,300 | 4,300 | 3,000 | 116 | 115 | T | 50%T |

*1% antioxidant BHT.
T—tear seal—failure of the bond in substrate.
Q—questionable tear seal—failure of the bond in substrate when pulled quickly but failure of the bond in the adhesive when pulled slowly.
50%T—about 50% of the bond failure involved failure in the substrate and about 50% failure in the adhesive.
N—no tear seal.

The compositions having 75.5–79.5 wt. percent atactic polypropylene, 3–8 wt. percent ethylene-vinyl acetate and 16.5–17.5 of the terpene (alpha-pinene in the five examples) are considered to produce the most satisfactory hot metal adhesives. Example 3 is representative of these preferred compositions. Although the tear seals of the Examples 2–5 are substantially the same, Example 3 exhibits a lower viscosity than Example 2 but the same high creep resistance. The compositions of Examples 4 and 5 have lower but still adequate creep resistance. The compositions of Examples 2 and 5 are much softer at room temperature than those where the ethylene-vinyl acetate content is reduced to less than 5%. This property relates directly to the ease of handling the hot melt compositions before they are melted for application. Compositions of Examples 2 and 3 are hard and more easily handled.

Although the tear seals of the compositions at −25° F. are not indicative of the strongest bond possible, they are satisfactory. Moreover, after the bonds were pulled apart at −25° F., they could be resealed simply by pressing the two substrates bearing the adhesives back together. Thus, what exists is a good tear seal at room temperature and a weaker seal at −25° F. which is capable of forming a pressure-sensitive bond after having been separated. These adhesives when applied to the closing flaps of multi-unit frozen food packages, provide seals of sufficient strength in handling, yet allow the packages to be opened and one or more of the multi-units removed, then the package resealed.

In order to further characterize the preferred compositions, the hot melt adhesive of Example 3 was tested for peel strength at ambient temperature on a Tinius-Olsen tensile tester.

*Example 6*

A 100 gram homogeneous mixture containing 90 parts by weight atactic polypropylene (stabilized with 1% BHT), 5 parts by weight of ethylene-vinyl acetate copolymer and 20 parts by weight of α-pinene resin was heated to 250° C. A 1 to 2 mil thickness of hot adhesives was applied to a one inch square area in the center of 1 by 3 inch strips of 50 pouhd kraft paper. To the hot adhesive bearing strips is immediately applied non-adhesive bearing strips of kraft paper, aluminum foil, polypropylene, polyethylene and cellophane, thus forming 1 by 3 inch test strips of substrates joined on internal surfaces over a 1 inch square area. The strips are cooled to room temperature and tested.

The peel test is conducted by securing one strip and attaching a pulling arm to one end of the second substrate so that the second substrate is pulled perpendicular to the adhesive layer. When the tester is activated, it records the grams necessary to cause a failure of the bond at the rate of 2 inches per minute across the one inch (2.5 cm.) width of the adhesive area.

TABLE IV

| Substrate bonded to kraft paper: | Adhesion (g./cm.) (failure of bond in adhesive) |
|---|---|
| Kraft paper | Fiber tear |
| Polypropylene | 356 |
| Polyethylene | 356 |
| Cellophane | 710 |
| Aluminum foil | 320 |

The results of the peel test indicate that rather good bonds are formed and that the hot melt adhesive is a surprisingly superior adhesive on cellophane.

In addition to the ingredients of hot melt adhesive, the composition of the present invention may contain functional materials such as antioxidants, coloring agents, fillers and the like.

The invention claimed is:

1. A thermoplastic hot melt adhesive composition comprising a homogeneous mixture of 74 to 82 wt. percent atactic polypropylene having a molecular weight of 16,000 to 20,000, 2 to 9 wt. percent ethylene-vinyl acetate copolymer resin having a ring and ball melt point of about 220° F. to 270° F. and containing about 18 to 34 weight percent vinyl acetate and 9 to 18 wt. percent of a terpene resin having a molecular weight of about 1200.

2. A thermoplastic hot melt adhesive composition comprising a homogeneous mixture of 75.5 to 79.5 wt. percent atactic polypropylene having a molecular weight of 16,000 to 20,000, 3 to 8 wt. percent ethylene-vinyl acetate copolymer resin having a ring and ball melt point of about 220° F. to 270° F, and containing about 30 to 34 wt. percent vinyl acetate and 16.5 to 17.6 weight percent of a terpene resin having a molecular weight of about 1200.

3. Composition according to claim 2 wherein the terpene is selected from the group consisting of alpha-pinene and beta-pinene.

4. A thermoplastic hot melt adhesive composition consisting essentially of a homogeneous mixture of about 90 parts by weight atactic polypropylene having a molecular weight of 16,000 to 20,000, about 5 parts by weight ethylene-vinyl acetate copolymer resin having a ring and ball melt point of about 220° F. to 270° F. and containing about 30 to 34 wt. percent vinyl acetate and about 20 parts a terpene resin selected from the group consisting of alpha-pinene and beta-pinene and having a molecular weight of about 1200, said composition being capable of forming a bond having a tear seal between kraft paper substrates.

References Cited

UNITED STATES PATENTS

| 2,543,229 | 2/1951 | Chapman | 260—897 |
| 2,772,247 | 11/1956 | Schroeder | 260—897 |
| 3,220,996 | 11/1965 | Flanagan | 260—897 |
| 3,245,931 | 4/1966 | Matthew | 260—897 |
| 3,247,142 | 4/1966 | Brunson et al. | 260—897 |
| 3,256,228 | 6/1966 | Tyran | 260—28.5 |
| 3,261,820 | 7/1966 | Natta et al. | 260—93.5 |
| 3,275,494 | 9/1966 | Brunson et al. | 260—897 |
| 3,284,380 | 11/1966 | Davis | 260—8 |

MURRAY TILLMAN, *Primary Examiner.*

T. G. FIELD, Jr, *Assistant Examiner.*